3,250,717
HYDRAULIC FLUID WHICH IS NOT DAMAGING TO RUBBER SEALS

Brace H. Lambert, Edwardsville, and Richard L. Woodruff, Alton, Ill., assignors to Shell Oil Company, New York, N.Y., a corporation of Delaware
No Drawing. Filed May 28, 1964, Ser. No. 371,121
5 Claims. (Cl. 252—78)

The present invention relates to conservation of resilience and control of swelling of elastomers when in contact with liquid hydrocarbons. More particularly the present invention is directed to hydrocarbon compositions which when in contact with elastomers prevent surface damage such as hardening, cracking and loss of flexibility and tensile strength.

It is known that liquid hydrocarbons, particularly those which are rich in aromatics have detrimental effects on elastomers such as mentioned above. In systems where elastomers are used as seals, rings and the like, in various types of transmission and hydraulic systems, damage to the elastomers in such systems by contacting fluids results in serious problems requiring costly repairs due to leakage, wear and the like. For example, in transmission systems damage to seals by the transmission fluids is a serious problem, particularly in view of the fact that various types of sealants and fluids are used and in a majority of cases the effects on each other are detrimental.

It has now been discovered that elastomers such as rubber seals in contact with functional fluids such as are used in transmission systems can be made to retain their swelling, flexibility and tensile strength by incorporating into the functional transmission fluids a minor amount of from about 0.5% to 10%, preferably from about 1% to about 5% by weight, a heterocyclic sulfur-oxygen-containing compound where the sulfur is a nuclear atom of a 5- or 6-membered ring and attached to the sulfur is oxygen atom e.g. >S=O (sulfoxide). Compounds of this type can be represented by formulas

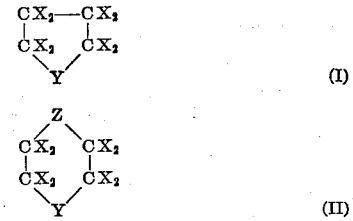

where X is hydrogen or one or two of the X's can be a hydrocarbyl radical, e.g., alkyl, aryl, alkaryl, aralkyl or cycloalkyl radical, preferably $C_{1-8}$ alkyl radical or polar groups e.g. amino, hydroxy, sulfonate, phosphate groups and the like, Y is a sulfoxy group, e.g., S=O and Z is the same as Y or is a $CX_2$ radical.

The compounds represented by Formulas I and II can be prepared by oxidizing the corresponding sulfides with suitable oxidizing agents such as described in U.S. Patents 2,581,050, 2,702,824, 2,859,248, and 3,005,852. Examples of cyclic sulfoxides useful in compositions of the present invention include tetramethylene sulfoxide, pentamethylene sulfoxide, 1-methyltetramethylene sulfoxide, 1,3-dimethyltetramethylene sulfoxide, 1,3 - dibutyltetramethylene sulfoxide, 1-methyl-3-butyltetramethylene sulfoxide, 1-methyl-3-cyclohexyltetramethylene sulfoxide, 1-ethyl - 3 - benzyltetramethylene sulfoxide, 1 - methyl - 3 - aminotetramethylene sulfoxide, 1-methyl-3-mercaptotetramethylene sulfoxide, 2,4-dimethyltetramethylene sulfoxide, 1,4-dimethylpentamethylene sulfoxide, 2,5-diethylpentamethylene sulfoxide, 1-methyl-4-aminopentamethylene sulfoxide, and mixtures thereof.

The elastomeric materials which are preserved from damage by being in contact with liquid hydrocarbons such as mineral oils, particularly mineral oils rich in aromatics or mineral oil compositions such as are used in transmission and hydraulic systems include any rubberlike materials and particularly those derived from polymerization of open-chain conjugated dienes e.g., butadiene-1,3, isoprene, pentadiene, chloroprene, etc. and copolymers of such materials with polymerizable compounds e.g. acrylonitrile, acrolein, methyl methacrylate, styrene, methyl styrene, vinyl halides and vinyl esters and the like. Important classes of such rubbers are Buna N rubbers which are copolymers of butadiene-1,3, and acrylonitrite, Buna S, copolymer of butadiene-1,3 and styrene. Still other synthetic rubbers include copolymers of butadiene and isobutylene (butyl rubber), chloroprene rubber, and the like. Natural rubber is also protected from damage by the additive of the present invention when in the presence of liquid hydrocarbons.

A particular embodiment of the present invention is the preservation of rubber sealants in various power and heat transmission systems, e.g. transmission and hydraulic systems, torque converters, etc., by addition to functional fluids employed in such systems a minor amount of from 0.5% to about 10%, preferably from about 1% to about 5% by weight of a cyclic sulfoxy compound represented by Formulas I and II and fully illustrated above. The functional fluids can be a natural mineral lubricating oil or synthetic oil (organic esters, e.g., organic phosphate bases or polyethers) containing minor amounts of improving agents such as alkyl phenols and arylamine inhibitors, detergents such as polyvalent metal petroleum sulfonates or metal alkyl phenol sulfides; oiliness or antiwear agents such as sulfurized fatty materials and viscosity index and pour point improvers such as polymerized alkyl acrylates, e.g., polymerized lauryl methacrylate in the molecular weight range of 15,000 to 500,000. Functional fluids of this type must meet exacting standards such as required by the automotive industry for transmission fluids Type A, or Type A, Suffix A, or Type C, or transmission and axle type lubricant or torque converter fluids meeting specification requirements as described in the SAE Handbook, 1961.

Examples of useful transmission fluids which render transmission systems leak proof and in cases of damaged rubber sealants function as rubber conditioners and sealants by addition of from 0.5% to 3% of cyclic sulfoxide are shown below.

Composition A

| | Weight percent |
|---|---|
| Basic Ca petroleum sulfonate | 10 |
| N,N'-di-sec-butylaminophenyl oxide | 0.5 |
| Sulfurized sperm oil | 2 |
| Polymerized $C_{4-18}$ alkyl methacrylate | 0.3 |
| 1,3-dimethyltetramethylene sulfoxide | 2 |
| Mineral lubricating oil (mixture 65 LVI and 100 HVI) | Balance |

Composition B

| | |
|---|---|
| Basic Ca petroleum sulfonate | 9.2 |
| Zn oleate | 0.25 |
| N,N'-di-sec-butylaminophenyl oxide | 0.5 |
| Polymerized $C_{4-18}$ alkyl methacrylate | 4.5 |
| 1,3-dimethyltetramethylene sulfoxide | 2.5 |
| Mineral lubricating oil | Balance |

Composition C

| | |
|---|---|
| Ca petroleum sulfonate | 2.5 |
| Zn dialkyldithiophosphate | 1.1 |
| 1,3-dimethyltetramethylene sulfoxide | 2 |
| Mineral lubricating oil | Balance |

Composition D

| | |
|---|---|
| Basic Ca petroleum sulfonate | 12.5 |
| N,N'-di-sec-butylaminophenyl oxide | 0.75 |
| Zn dialkyldithiophosphate | 0.1 |
| Sulfurized sperm oil | 2 |
| Polymerized $C_{4-18}$ alkyl methacrylate | 2.5 |
| 1,3-dimethyltetramethylene sulfoxide | 2.5 |
| Mineral lubricating oil | Balance |

Composition E

| | |
|---|---|
| Mixture of Ba petroleum sulfonate and Zn dialkylthionothiophosphate | 5 |
| Polymerized $C_{4-18}$ alkyl methacrylate | 4.5 |
| 1,3-dimethyltetramethylene sulfoxide | 2 |
| Mineral lubricating oil (100N) | Balance |

Composition F

| | |
|---|---|
| Ca salt of condensation product of formaldehyde and alkyl phenol | 4 |
| 1,3-dimethyltetramethylene sulfoxide | 2.5 |
| Mineral lubricating oil | Balance |

Composition G

| | |
|---|---|
| Stearic acid | 1.2 |
| 1,3-dimethyltetramethylene sulfoxide | 1.2 |
| Mineral lubricating oil | Balance |

Composition H

| | |
|---|---|
| Stearyl acid phosphate | 0.1 |
| Stearic acid | 0.2 |
| 1,3-dimethyltetramethylene sulfoxide | 2 |
| Mineral lubricating oil | Balance |

Composition I

| | |
|---|---|
| Basic Ca petroleum sulfonate | 10 |
| N,N'-di-sec-butylaminophenyl oxide | 0.5 |
| Sulfurized sperm oil | 2 |
| Polymerized $C_{4-18}$ alkyl methacrylate | 0.3 |
| 1,3-dimethyltetramethylene sulfone | 2 |
| Mineral lubricating oil | Balance |

Composition J

| | |
|---|---|
| Mixture of Ba petroleum sulfonate and Zn dialkylthionothiophosphate | 5 |
| Polymerized $C_{4-18}$ alkylmethacrylate | 4.5 |
| 1,3-diethyltetramethylene sulfoxide | 2 |
| Mineral lubricating oil (100N) | Balance |

The essence of the invention is illustrated by the following test, the results of which are shown in Table I–III.

Buna N (copolymer butadiene/acrylonitrile) rubber seals were immersed in test compositions and the solution was maintained at 300° F. for 7 days after which the rubber seals were examined and the results noted below in Table I.

TABLE I

| Composition | Net increase in volume over that obtained in base stock (percent) | Hardening | Flexibility [1] |
|---|---|---|---|
| Mineral lubricating oil | [2] 0 | Severe | Very poor. |
| Composition A–J | 10–30 | Softened | Excellent. |
| Composition A'–J' (equivalent to A–J except that the 1,3-dimethyltetramethylene sulfoxide is omitted). | 0–2 | Mild to severe. | Poor to fair. |

[1] Measured by bending around 3/16 in. mandrel, noting cracks.
[2] Buna N rubber decreases in volume by 2% in base stock alone.

In another test meeting requirement for a Type C–1 Fluid for heavy duty transmission fluids Composition D was tested to meet Type C–1 requirements and the results are shown in Table II.

TABLE II

| | Type C–1 Spec. | Composition D [1] |
|---|---|---|
| Physical Properties: | | |
| Viscosity at 210° F., SSU | 45 min | 45.5 |
| Brookfield vis. at 0° F., cp | 2,400 max | 1,000 |
| Pour point, °F | −20 max | −65 |
| $H_2O$ content | None | None |
| Antifoam property: | | |
| Seq 1: following 10 min. collapse | 300 ml. max | 0 |
| Seq 2: following 10 min. collapse | 25 ml. max | 0 |
| Seq 3: following 10 min. collapse | 300 ml. max | 0 |
| Bench and rig tests: | | |
| Power steering pump vane wear test, percent wear. | 0.04 max | 0.0004 |
| Oxidation test, 150 hr. at 300° F., 8 liters/hr. air flow, Cu and Fe wire catalysts vis. increase at 210° F., percent. | 15 max | 2.35 |
| Rubber seal test, 70 hrs. at 300° F., Buna N rubber: | | |
| Volume change, percent | +1 to +5 | 2.9 |
| Hardness change, points | ±5 | −5 |
| 180° bend test | No cracking | ([2]) |
| Tackiness or decomposition | None | None |
| CRC, L-39 powerglide test, 300 hr. at 325° F. sump temp. | No varnish or sludge | Passed [3] |
| Full-scale tests | Satisfactory operation of commercial hydraulic transmissions when operated under conditions specified by manufacturer. | ([4]) |

[1] When Composition D' (same as D except the 1,3-dimethyltetramethylene sulfoxide was removed) was used in this test, the rubber seals were badly cracked and damaged.
[2] Passed, no cracking.
[3] Composition D passed three such tests. In the first of these the fluid was subjected first to 300 hours at 300° F. sump temperature and then followed by an additional 300 hours at 325° F.
[4] Passed manufacturer's requirements.

Composition E was tested in a GM Hydra-Matic transmission under conditions noted in Table III and the results were as follows:

TABLE III

| | Composition E [1] |
|---|---|
| Inspection properties: | |
| Viscosity at 100° F., SSU | 142.7 |
| Viscosity at 210° F., SSU | 50.9 |
| Brookfield viscosity at −20° F., cp | 2,200 |
| Brookfield viscosity at −40° F., cp | 22,500 |
| Viscosity index | 170 |
| Viscosity loss at 210° F., SSU—Power-steering pump test: | |
| 8 hr | 2.8 |
| 30 hr | 4.6 |
| Type A suffix A rubber swell, percent | +2.4 |
| Flash point, ° F. | 320 |
| 300° F., Allison Type-C fluid—Bench oxidation test: Cleanliness life, hr | 240 |
| Chrysler heat test: Cleanliness life, hr | 400 |

[1] When Composition E' (same as Composition E but 1,3-dimethyltetramethylene sulfoxide was omitted) was used in this test, the rubber seals were badly damaged, oxidation life was reduced from 240 to 170 hours and cleanliness life was reduced from 400 to 240 hours.

We claim as our invention:

1. A hydraulic fluid which is not damaging to rubber seals consisting essentially of a major amount of mineral lubricating oil and from about 0.5% to about 10% of an organic cyclic sulfoxide selected from the group consisting of

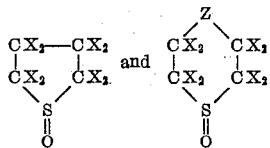

where the X's are independently selected from the group consisting of hydrogen and $C_{1-8}$ alkyl radicals and wherein not more than 2 of the X's are $C_{1-8}$ alkyl radicals and Z is a radical selected from the group consisting of $>S=O$ and $CX_2$ where X is as defined.

2. A hydraulic fluid which is not damaging to rubber seals consisting essentially of a major amount of mineral lubricating oil and from about 0.5% to about 10% of an organic cyclic sulfoxide having the formula

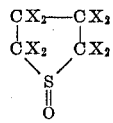

where the X's are the same as in claim 1.

3. A hydraulic fluid which is not damaging to rubber seals consisting essentially of a major amount of mineral lubricating oil and from about 0.5% to about 10% of an organic cyclic sulfoxide having the formula

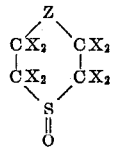

where Z and X's are the same as in claim 1.

4. A hydraulic fluid which is not damaging to rubber seals consisting essentially of a major amount of mineral lubricating oil and from about 0.5% to about 10% of a cyclic tetramethylene sulfoxide.

5. A hydraulic fluid which is not damaging to rubber seals consisting essentially of a major amount of mineral lubricating oil and from about 0.5% to about 10% of a cyclic 1,3-dimethyltetramethylene sulfoxide.

References Cited by the Examiner

UNITED STATES PATENTS 2,394,251  2/1946  Morris et al. _____ 252—75 X
2,947,693  8/1960  Boyle et al. _____ 252—75 X ALBERT T. MEYERS, *Primary Examiner.*

JULIUS GREENWALD, *Examiner.*

R. D. LOVERING, *Assistant Examiner.*